United States Patent
Yamamoto et al.

(10) Patent No.: US 8,688,355 B2
(45) Date of Patent: Apr. 1, 2014

(54) INTAKE AIR FLOW RATE CONTROL DEVICE FOR INTERNAL COMBUSTION ENGINE

(75) Inventors: Masakazu Yamamoto, Kariya (JP); Shinichi Soejima, Gotenba (JP); Naoto Kato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 13/394,244

(22) PCT Filed: Nov. 2, 2010

(86) PCT No.: PCT/IB2010/002780
§ 371 (c)(1), (2), (4) Date: Mar. 5, 2012

(87) PCT Pub. No.: WO2011/055207
PCT Pub. Date: May 12, 2011

(65) Prior Publication Data
US 2012/0166064 A1 Jun. 28, 2012

(30) Foreign Application Priority Data
Nov. 4, 2009 (JP) ................................. 2009-253418

(51) Int. Cl.
*F02D 41/04* (2006.01)
*F02D 11/10* (2006.01)
*F02D 9/02* (2006.01)

(52) U.S. Cl.
USPC .......................................... 701/103; 123/399

(58) Field of Classification Search
USPC .......... 701/103, 101, 102; 123/399, 361, 367, 123/376, 403
See application file for complete search history.

(56) References Cited

U.S. PATENT DOCUMENTS 5,415,142 A * 5/1995 Tsubakiji et al. .............. 123/336
7,143,741 B2 * 12/2006 Yagi .............................. 123/399
(Continued)

FOREIGN PATENT DOCUMENTS

DE 102007025432 (A1) 6/2008
EP 1 063 393 A2 12/2000
(Continued)

OTHER PUBLICATIONS

International Search Report issued in International Application No. PCT/IB2010/002780 dated Mar. 4, 2011.
(Continued)

*Primary Examiner* — Hieu T Vo
(74) *Attorney, Agent, or Firm* — Oliff PLC (57) ABSTRACT

A required intake air flow rate is converted to a post-model required intake air flow rate (BMtsm) by a base-system normative model, and the inverse model of an intake system model is used to calculate a base-system required throttle opening degree (BTA) so as to achieve the post-model required intake air flow rate (BMtsm). On the other hand, the required in-take air flow rate (Mt) is converted to a post-model required intake air flow rate (HMtsm) by a high-response-system normative model, and the inverse model of the intake system model is used to calculate a high-response-system required throttle opening degree (HTA) so as to achieve the post-model required intake air flow rate (HMTsm). Then, a target throttle opening degree (TAt) is set so as to fall within the range from the base-system required throttle opening degree (BTA) to the high-response-system required throttle opening degree (HTA) and the reduce a variation amount.

4 Claims, 8 Drawing Sheets

(56) References Cited

U.S. PATENT DOCUMENTS

| | | |
|---|---|---|
| 7,856,305 B2 * | 12/2010 | Eiraku .................. 701/103 |
| 2002/0078924 A1 | 6/2002 | Yagi |
| 2003/0051474 A1 | 3/2003 | Shirakawa |
| 2005/0103309 A1 | 5/2005 | Nakagawa et al. |
| 2006/0112929 A1 | 6/2006 | Muto et al. |
| 2007/0068489 A1 | 3/2007 | Osumi et al. |
| 2008/0127938 A1 | 6/2008 | Hagari |
| 2009/0250037 A1 | 10/2009 | Eiraku |

FOREIGN PATENT DOCUMENTS

| | | |
|---|---|---|
| JP | A-6-288284 | 10/1994 |
| JP | A-2006-070701 | 3/2006 |
| JP | A-2006-152848 | 6/2006 |
| JP | A-2006-200466 | 8/2006 |
| JP | B2-3873608 | 1/2007 |
| JP | A-2007-056698 | 3/2007 |
| JP | A-2007-92531 | 4/2007 |
| JP | A-2007-263051 | 10/2007 |
| WO | WO 02/081888 A1 | 10/2002 |
| WO | WO 2007/088761 A1 | 8/2007 |
| WO | WO 2010/064313 A1 | 6/2010 |

OTHER PUBLICATIONS

Written Opinion issued in International Application No. PCT/IB2010/002780 dated Mar. 4, 2011.

* cited by examiner

INTAKE AIR FLOW RATE CONTROL DEVICE FOR INTERNAL COMBUSTION ENGINE

BACKGROUND OF THE INVENTION

1. Field of the Invention

The invention relates to an intake air flow rate control device for an internal combustion engine, which has a function of calculating a target throttle opening degree on the basis of a required intake air flow rate of the internal combustion engine.

2. Description of the Related Art

In control over the intake air flow rate (air flow rate taken into a cylinder) of an internal combustion engine, there is a technique for compensating for a delay in response of an intake system (for example, a delay in response of a throttle valve or a delay in response due to the volume of an intake passage). For example, Japanese Patent Application Publication No. 2006-70701 (JP-A-2006-70701) describes that a target intake air flow rate of the internal combustion engine is converted to a target intake air flow rate that may be achieved by a normative model and then the inverse model of a model that takes a delay in response of the intake system into consideration is used to calculate a target throttle opening degree so that the output of the normative model coincides with an actual intake air flow rate (or an estimated intake air flow rate).

In addition, Japanese Patent No. 3873608 describes that the ratio of opening areas before and after movement of a throttle valve is calculated on the basis of a target intake pipe pressure calculated from a target intake air flow rate of an internal combustion engine and then a target throttle opening degree after movement of the throttle valve is calculated on the basis of the ratio of opening areas before and after movement of the throttle valve and an opening area before movement of the throttle valve.

Incidentally, when the inverse model of an intake system model that takes a delay in response of the intake system into consideration is used to calculate a target throttle opening degree from a required intake air flow rate, the target throttle opening degree tends to vary with oscillations. As the target throttle opening degree oscillates, the actual throttle opening degree oscillates and, therefore, the variation amount of the actual throttle opening degree increases. This may increase the amount of wear of a sliding portion of a throttle device formed of, for example, a throttle valve and a motor that drives the throttle valve to decrease durability or may cause the motor that drives the throttle valve to overheat.

Then, Japanese Patent Application Publication No. 2006-200466 (JP-A-2006-200466) describes that the inverse model of an intake system model that takes a delay in response of the intake system into consideration is used to calculate a target throttle opening degree from a required intake air flow rate during transitional operation of an internal combustion engine; whereas a target throttle opening degree is calculated on the basis of the operating state of the internal combustion engine without using the inverse model of the intake system model during steady operation of the internal combustion engine.

In the technique described in JP-A-2006-200466, a target throttle opening degree is calculated on the basis of the operating state of the internal combustion engine without using the inverse model of the intake system model during steady operation of the internal combustion engine, so oscillation of the target throttle opening degree may be suppressed. However, during transitional operation of the internal combustion engine, a target throttle opening degree is calculated from a required intake air flow rate using the inverse model of the intake system model in order to compensate for a delay in response of the intake system, so oscillation of the target throttle opening degree cannot be suppressed, and it is difficult to eliminate inconvenience due to oscillation of the target throttle opening degree.

The invention provides an intake air flow rate control device for an internal combustion engine, which is able to set a target throttle opening degree that is compensated for a delay in response of an intake system while suppressing oscillation of the target throttle opening degree even during transitional operation of the internal combustion engine.

A first aspect of the invention relates to an intake air flow rate control device for an internal combustion engine, which has a function of calculating a target throttle opening degree on the basis of a required intake air flow rate of the internal combustion engine. The intake air flow rate control device includes: first required throttle opening degree calculation means that calculates a first required throttle opening degree in consideration of a delay in response of an intake system on the basis of the required intake air flow rate; second required throttle opening degree calculation means that calculates a second required throttle opening degree in consideration of a delay in response of the intake system on the basis of the required intake air flow rate in a response characteristic different from that of the first required throttle opening degree calculation means; and target throttle opening degree calculation means that calculates the target throttle opening degree on the basis of the first required throttle opening degree and the second required throttle opening degree, wherein the target throttle opening degree calculation means sets the target throttle opening degree so that the target throttle opening degree falls within the range from the first required throttle opening degree to the second required throttle opening degree and a variation amount of the target throttle opening degree is smaller than a variation amount of any one of the first and second required throttle opening degrees.

With the above configuration, the first required throttle opening degree and the second required throttle opening degree are calculated from the required intake air flow rate in consideration of a delay in response of the intake system, one of the first and second required throttle opening degrees is set as a low-response side allowable limit value of the required throttle opening degree, and the other one is set as a high-response side allowable limit value of the required throttle opening degree. By so doing, it is possible to set an allowable range of the required throttle opening degree that is compensated for a delay in response of the intake system. Then, the target throttle opening degree is set so as to fall within the range from the first required throttle opening degree to the second required throttle opening degree (that is, allowable range of the required throttle opening degree that is compensated for a delay in response of the intake system). By so doing, the target throttle opening degree that is compensated for a delay in response of the intake system may be set within the allowable range. Furthermore, the target throttle opening degree is set so that a variation amount of the target throttle opening degree is smaller than a variation amount of any one of the first and second required throttle opening degrees. By so doing, oscillation of the target throttle opening degree may be suppressed. In this Way, the target throttle opening degree that is compensated for a delay in response of the intake system may be set while suppressing oscillation of the target throttle opening degree even during transitional operation of the internal combustion engine.

The first required throttle opening degree calculation means and the second required throttle opening degree calculation means each may have a function of converting the required intake air flow rate to a required intake air flow rate, of which a response may be achieved by a predetermined normative model, (hereinafter, referred to as "post-model required intake air flow rate"), and calculating the required throttle opening degree so as to achieve the post-model required intake air flow rate using the inverse model of an intake system model that takes a delay in response of the intake system into consideration, a response characteristic of the normative model in the first required throttle opening degree calculation means may be different from a response characteristic of the normative model in the second required throttle opening degree calculation means. By so doing, the response characteristic of the required throttle opening degree may be changed by a simple method that the response characteristic (for example, time constant) of the normative model is varied between the first required throttle opening degree calculation means and the second required throttle opening degree calculation means.

In addition, when the target throttle opening degree is set on the basis of the first required throttle opening degree and the second required throttle opening degree, the intake air flow rate control device may further include throttle opening degree estimating means that calculates an estimated throttle opening degree, which is an estimated actual throttle opening degree, on the basis of a last value of the target throttle opening degree, wherein the target throttle opening degree calculation means may set the estimated throttle opening degree as the target throttle opening degree when the estimated throttle opening degree falls within the range from the first required throttle opening degree to the second required throttle opening degree, and may set one of the first required throttle opening degree and the second required throttle opening degree, which is closer to the estimated throttle opening degree, as the target throttle opening degree when the estimated throttle opening degree falls outside the range from the first required throttle opening degree to the second required throttle opening degree. By so doing, it is possible to reduce a variation amount of the target throttle opening degree while maintaining the target throttle opening degree within the range from the first required throttle opening degree to the second required throttle opening degree. In this case, a deviation between the estimated throttle opening degree (estimated actual throttle opening degree) and the target throttle opening degree may be reduced, so the variation amount of the actual throttle opening degree may be effectively reduced. Thus, it is possible to effectively improve durability by reducing the amount of wear of a sliding portion of a throttle device.

Alternatively, the target throttle opening degree calculation means may set a last value of the target throttle opening degree as a current value of the target throttle opening degree when the last value of the target throttle opening degree falls within the range from the first required throttle opening degree to the second required throttle opening degree, and may set one of the first required throttle opening degree and the second required throttle opening degree, which is closer to a last value of the target throttle opening degree, as a current value of the target throttle opening degree when the last value of the target throttle opening degree falls outside the range from the first required throttle opening degree to the second required throttle opening degree. By so doing as well, it is possible to reduce a variation amount of the target throttle opening degree while maintaining the target throttle opening degree within the range from the first required throttle opening degree to the second required throttle opening degree. In this case, a deviation between the last value and current value of the target throttle opening degree may be reduced, so the variation amount of the target throttle opening degree may be effectively reduced. Thus, fluctuations in electric current flowing through the motor that drives the throttle valve are suppressed to thereby make it possible to effectively prevent overheating of the motor.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of the invention will be described.

A first embodiment of the invention will be described with reference to FIG. 1 to FIG. 6. First, the schematic configuration of an overall engine control system will be described with reference to FIG. 1. An air cleaner 13 is provided at an upstreammost portion of an intake pipe 12 of an engine 11 that serves as an internal combustion engine. An air flow meter 14 is provided downstream of the air cleaner 13. The air flow meter 14 detects an intake air flow rate. A throttle valve 16 and a throttle opening degree sensor 17 are provided downstream of the air flow meter 14. The opening degree of the throttle valve 16 is regulated by a motor 15. The throttle opening degree sensor 17 detects the opening degree of the throttle valve 16 (throttle opening degree).

Figure 1:
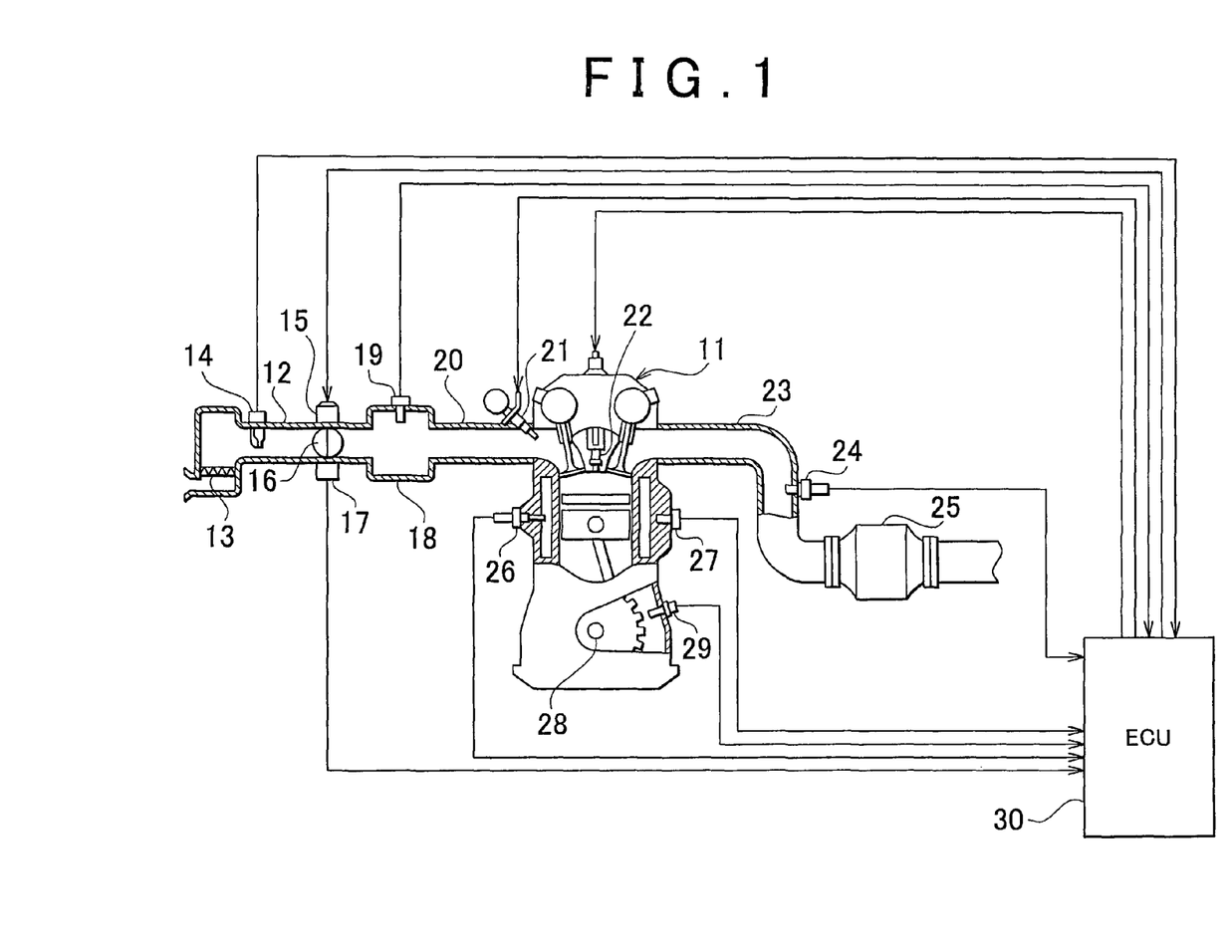
FIG. 1 is a view that shows the schematic configuration of an engine control system according to a first embodiment of the invention.

Furthermore, a surge tank 18 is provided downstream of the throttle valve 16, and an intake pipe pressure sensor 19 is provided for the surge tank 18. The intake pipe pressure sensor 19 detects an intake pipe pressure. In addition, an intake manifold 20 is connected to the surge tank 18. The intake manifold 20 introduces air into each cylinder of the engine 11. A fuel injection valve 21 is provided near an intake port of the intake manifold 20 of each cylinder. The fuel injection valve 21 injects fuel toward a corresponding one of the intake ports. In addition, an ignition plug 22 is attached to a cylinder head of the engine 11 cylinder by cylinder, and air-fuel mixture in each cylinder is ignited by spark discharge of the ignition plug 22.

On the other hand, an exhaust gas sensor 24 (air-fuel ratio sensor, oxygen sensor, or the like) is provided in an exhaust pipe 23 of the engine 11. The exhaust gas sensor 24 detects the air-fuel ratio, rich/lean, or the like, of exhaust gas. A catalyst 25, such as a three-way catalyst, is provided downstream of the exhaust gas sensor 24. The catalyst 25 purifies exhaust gas.

In addition, a coolant temperature sensor 26 and a knock sensor 27 are attached to a cylinder block of the engine 11. The coolant temperature sensor 26 detects coolant temperature. The knock sensor 27 detects knocking. In addition, a crank angle sensor 29 is provided on an outer peripheral side of a crankshaft 28. The crank angle sensor 29 outputs a pulse signal each time the crankshaft 28 rotates a predetermined crank angle. A crank angle and an engine rotational speed are detected on the basis of an output signal of the crank angle sensor 29.

Outputs of these various sensors are input to an engine control circuit (hereinafter, referred to as "ECU") 30. The ECU 30 is principally formed of a microcomputer. The ECU 30 executes various engine control programs stored in a built-in ROM (storage medium) to control the fuel injection amount of each fuel injection valve 21 and the ignition timing of each ignition plug 22 in accordance with an engine operating state and also to control an intake air flow rate (air flow rate at which air is taken into each cylinder) by controlling a motor 15 so that an actual throttle opening degree detected by the throttle opening degree sensor 17 coincides with a target throttle opening degree.

Then, the ECU 30 calculates a required intake air flow rate on the basis of an engine operating condition (for example, an accelerator operation amount, a required torque, or the like), and then calculates a target throttle opening degree as follows on the basis of the required intake air flow rate.

Figure 2:
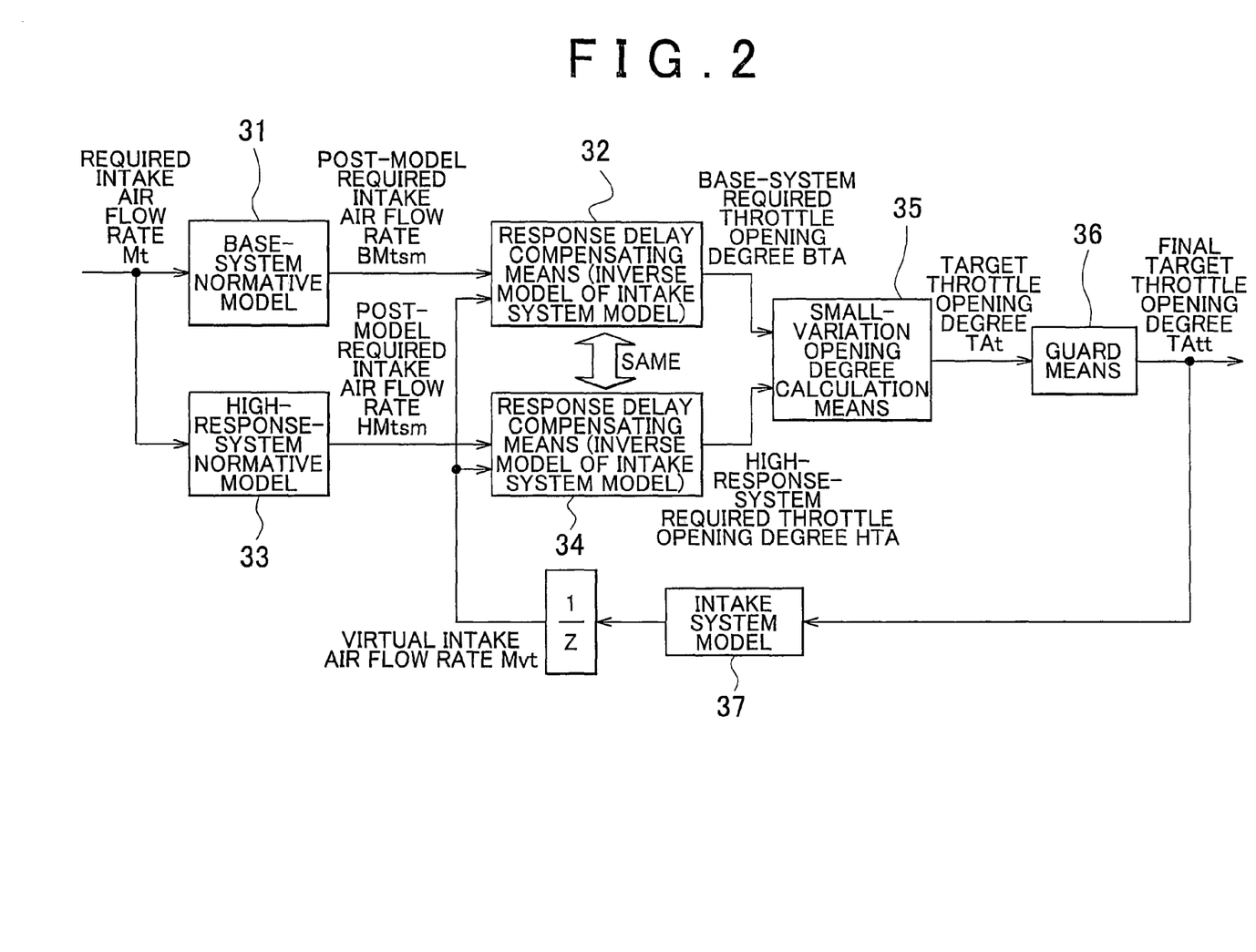
FIG. 2 is a block diagram that illustrates the functions of intake air flow rate control.

As shown in FIG. 2, a required intake air flow rate Mt is converted to a base-system post-model required intake air flow rate BMtsm (a required intake air flow rate of which a response may be achieved in all the operating range) by a base-system normative model 31, and then response delay compensating means 32 uses the inverse model of an intake system model that takes a delay in response of an intake system (for example, a delay in response of the throttle valve 16 or a delay in response due to the volume of an intake passage) to calculate a base-system required throttle opening degree BTA (first required throttle opening degree) so as to achieve the base-system post-model required intake air flow rate BMtsm. The base-system required throttle opening degree BTA is a low-response side allowable limit value of a required throttle opening degree (for example, an allowable limit value to which the response of an actual intake air flow rate to a required intake air flow rate may be ensured). These base-system normative model 31 and response delay compensating means 32 serve as first required throttle opening degree calculation means according to the aspect of the invention.

The ECU 30 executes a base-system normative model routine shown in FIG. 4, which will be described later, to function as the base-system normative model 31. The ECU 30 calculates a current post-model required intake air flow rate Mtsm (current output value) using a first-order lag model (first-order low-pass filter) expressed by the following mathematical expression (1) using a last post-model required intake air flow rate Mtsm.old (last output value) and a current required intake air flow rate Mt (current input value).

$$Mtsm = (C1 \times Mtsm.old + T1 \times Mt)/(C1 + T1) \quad (1)$$

Here, C1 is a first-order lag filter time constant (for example, 10 ms), and T1 is a processing interval (for example, 8 ms).

Furthermore, a current base-system post-model required intake air flow rate BMtsm (current output value) is calculated by a first-order lag model (first-order low-pass filter) expressed by the following mathematical expression (2) using the last base-system post-model required intake air flow rate BMtsm.old (last output value) and the current post-model required intake air flow rate Mtsm (current input value).

$$BMtsm = (C2 \times BMtsm.old + T1 \times Mtsm)/(C2 + T1) \quad (2)$$

Here, C2 is a first-order lag filter time constant (for example, 32 ms), and T1 is a processing interval (for example, 8 ms).

The response characteristic (time constant C1 or C2) of the base-system normative model 31 is set so that the base-system required throttle opening degree BTA becomes a low-response side allowable limit value of the required throttle opening degree (for example, an allowable limit value to which the response of an actual intake air flow rate to a required intake air flow rate may be ensured).

After that, the response delay compensating means 32 calculates the base-system required throttle opening degree BTA from the base-system post-model required intake air flow rate BMtsm using the inverse model of the intake system model that takes a delay in response of the intake system into consideration, and also corrects the base-system required throttle opening degree BTA so as to reduce a deviation between the base-system post-model required intake air flow rate BMtsm and a virtual intake air flow rate Mvt (an actual intake air flow rate estimated from a last final target throttle opening degree TAtt) to thereby obtain the base-system required throttle opening degree BTA in order to achieve the base-system post-model required intake air flow rate BMtsm.

Specifically, an intake pipe pressure BPm required to achieve the base-system post-model required intake air flow rate BMtsm is calculated, and then a throttle passing air flow rate BMi required to achieve the intake pipe pressure BPm is calculated. Furthermore, a throttle opening area BAt required to achieve the throttle passing air flow rate BMi is calculated, and then a base-system required throttle opening degree BTA required to achieve the throttle opening area BAt is calculated.

Furthermore, a feedback correction amount BTAfb is calculated through PI control, or the like, so as to reduce the deviation between the base-system post-model required intake air flow rate BMtsm and the virtual intake air flow rate Mvt (actual intake air flow rate estimated from the last final target throttle opening degree TAtt), and then the base-system required throttle opening degree BTA is corrected by the following mathematical expression (3) using the feedback correction amount BTAfb.

$$BTA = BTA + BTAfb \quad (3)$$

On the other hand, a required intake air flow rate Mt is converted into a high-response-system post-model required intake air flow rate HMtsm (a required intake air flow rate of which a response may be achieved in all the operating range) by a high-response-system normative model 33 (which is different in response characteristic from the base-system normative model 31), and then response delay compensating means 34 calculates a high-response-system required throttle opening degree HTA (second required throttle opening degree) using the inverse model of the intake system model that takes a delay in response of the intake system into consideration (the same model as the inverse model of the intake system model used in the response delay compensating means 32) so as to achieve the high-response-system post-model required intake air flow rate HMtsm. The high-response-system required throttle opening degree HTA is a high-response side allowable limit value of a required throttle opening degree (for example, an allowable limit value to which an overshoot of an actual intake air flow rate with respect to a required intake air flow rate may be suppressed). These high-response-system normative model 33 and response delay compensating means 34 serve as second required throttle opening degree calculation means according to the aspect of the invention.

The ECU 30 executes a high-response-system normative model routine shown in FIG. 5, which will be described later, to function as the high-response-system normative model 33. The ECU 30 calculates a current high-response-system post-model required intake air flow rate HMtsm (current output value) using a last high-response-system post-model required intake air flow rate HMtsm.old (last output value) and a current required intake air flow rate Mt (current input value) by a first-order lag model (first-order low-pass filter) expressed by the following mathematical expression (4).

$$HMtsm = (C3 \times HMtsm.\text{old} + T1 \times Mt)/(C3+T1) \quad (4)$$

Here, C3 is a first-order lag filter time constant (for example, 32 ms), and T1 is a processing interval (for example, 8 ms).

The response characteristic (time constant C3) of the high-response-system normative model 33 is set so that the high-response-system required throttle opening degree HTA becomes a high-response side allowable limit value of the required throttle opening degree (for example, an allowable limit value to which an overshoot of an actual intake air flow rate with respect to a required intake air flow rate may be suppressed).

After that, the response delay compensating means 34 calculates the high-response-system required throttle opening degree HTA from the high-response-system post-model required intake air flow rate HMtsm using the inverse model (which is the same model as the inverse model of the intake system model used in the response delay compensating means 32) of the intake system model that takes a delay in response of the intake system into consideration, and also corrects the high-response-system required throttle opening degree HTA so as to reduce the deviation between the high-response-system post-model required intake air flow rate HMtsm and a virtual intake air flow rate Mvt (actual intake air flow rate estimated from a last final target throttle opening degree TAtt) to thereby obtain the high-response-system required throttle opening degree HTA for achieving the high-response-system post-model required intake air flow rate HMtsm.

Specifically, an intake pipe pressure HPm required to achieve the high-response-system post-model required intake air flow rate HMtsm is calculated, and then a throttle passing air flow rate HMi required to achieve the intake pipe pressure HPm is calculated. Furthermore, a throttle opening area HAt required to achieve the throttle passing air flow rate HMi is calculated, and then a high-response-system required throttle opening degree HTA required to achieve the throttle opening area HAt is calculated.

Furthermore, a feedback correction amount HTAfb is calculated through PI control, or the like, so as to reduce the deviation between the high-response-system post-model required intake air flow rate HMtsm and the virtual intake air flow rate Mvt (actual intake air flow rate estimated from the last final target throttle opening degree TAtt), and then the feedback correction amount HTAfb is used to correct the high-response-system required throttle opening degree HTA using the following mathematical expression (5).

$$HTA = HTA + HTAfb \quad (5)$$

The range from the calculated base-system required throttle opening degree BTA to the calculated high-response-system required throttle opening degree HTA is set as an allowable range of the required throttle opening degree that is compensated for a delay in response of the intake system.

After that, small-variation opening degree calculation means 35 (target throttle opening degree calculation means) sets a target throttle opening degree TAt so that the target throttle opening degree TAt falls within the range from the base-system required throttle opening degree BTA to the high-response-system required throttle opening degree HTA and the variation amount of the target throttle opening degree TAt is smaller than the variation amount of any one of the required throttle opening degrees BTA and HTA.

The target throttle opening degree TAt is set so as to fall within the range from the base-system required throttle opening degree BTA to the high-response-system required throttle opening degree HTA (that is, within the allowable range of the required throttle opening degree that is compensated for a delay in response of the intake system). By so doing, the target throttle opening degree TAt that is compensated for a delay in response of the intake system may be set within the allowable range. Furthermore, the target throttle opening degree TAt is set so that the variation amount of the target throttle opening degree TAt is smaller than the variation amount of any one of the required throttle opening degrees BTA and HTA. By so doing, oscillation of the target throttle opening degree TAt may be suppressed.

Figure 3:
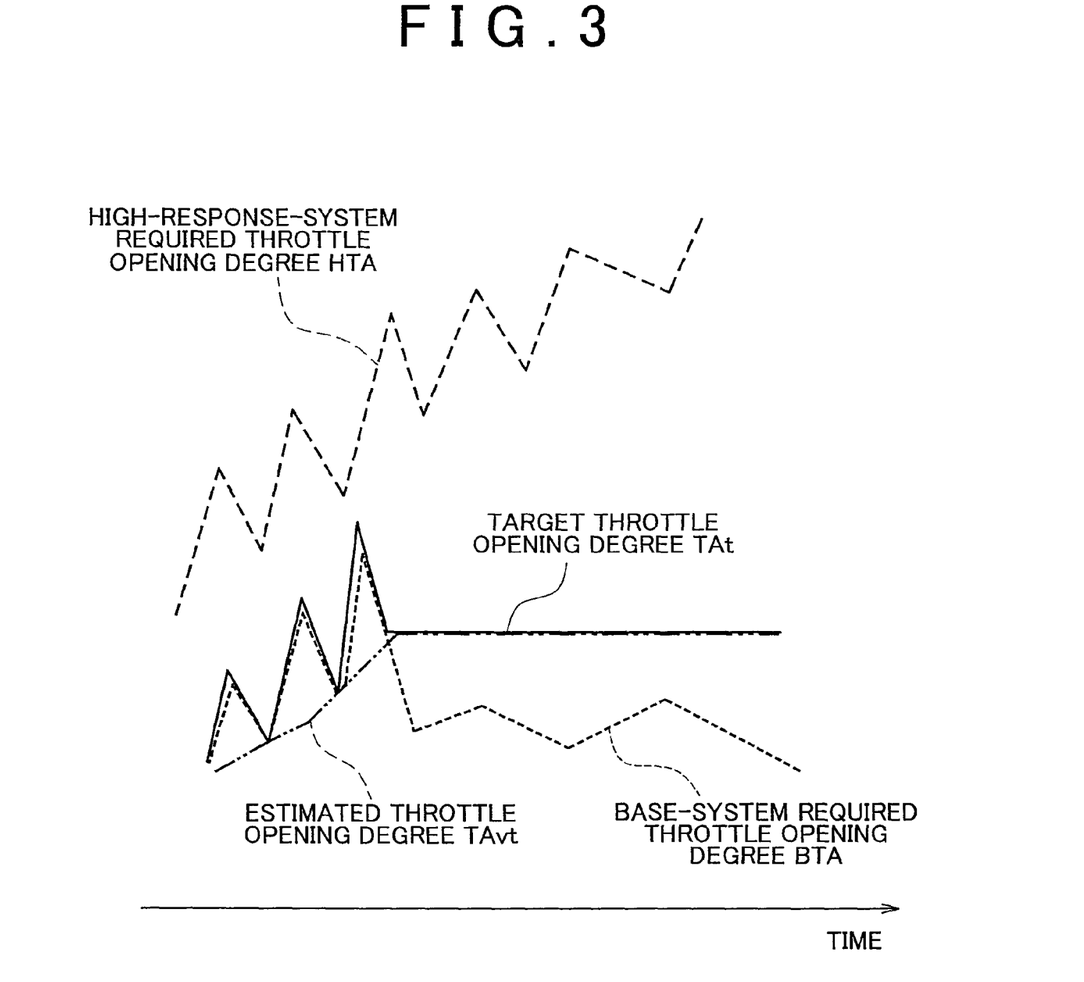
FIG. 3 is a time chart that illustrates a method of setting a target throttle opening degree according to the first embodiment.

The ECU 30 executes a small-variation opening degree calculation routine shown in FIG. 6, which will be described later, to function as the small-variation opening degree calculation means 35. As shown in FIG. 3, an estimated throttle opening degree TAvt (actual throttle opening degree estimated from the previous final target throttle opening degree TAtt) is set as a target throttle opening degree TAt when the estimated throttle opening degree TAvt falls within the range from the base-system required throttle opening degree BTA to the high-response-system required throttle opening degree HTA. On the other hand, when the estimated throttle opening degree TAvt falls outside the range from the base-system required throttle opening degree BTA to the high-response-system required throttle opening degree HTA, one of the base-system required throttle opening degree BTA and the high-response-system required throttle opening degree HTA, which is closer to the estimated throttle opening degree TAvt, is set as the target throttle opening degree TAt. By so doing, while the target throttle opening degree TAt is maintained within the range from the base-system required throttle opening degree BTA to the high-response-system required throttle opening degree HTA, the variation amount of the target throttle opening degree TAt is reduced. In this case, a deviation between the estimated throttle opening degree TAvt (estimated actual throttle opening degree) and the target throttle opening degree TAt may be reduced, so the variation amount of the actual throttle opening degree may be effectively reduced.

After that, as shown in FIG. 2, guard means 36 carries out guard process in which the target throttle opening degree TAt is limited by an upper limit guard value (for example, 84 deg) and a lower limit guard value (for example, 0 deg) and a variation rate (variation amount per unit predetermined period of time) of the target throttle opening degree TAt is limited by an upper limit rate guard value (for example, +6.8 deg/8 ms) and a lower limit rate guard value (for example, −6.8 deg/8 ms) to thereby set the final target throttle opening degree TAtt (final target throttle opening degree).

Furthermore, a virtual intake air flow rate Mvt (estimated actual intake air flow rate) is calculated from the final target throttle opening degree TAtt using the intake system model 37. Specifically, the final target throttle opening degree TAtt is subjected to lag process (for example, first-order lag process) to obtain an estimated throttle opening degree TAvt (estimated actual throttle opening degree), a throttle opening area At is calculated from the estimated throttle opening degree TAvt, and then a throttle passing air flow rate Mi is calculated from the throttle opening area At. Furthermore, an intake pipe pressure Pm is calculated from the throttle passing air flow rate Mi, and a virtual intake air flow rate Mvt is calculated from the intake pipe pressure Pm.

Hereinafter, the detailed process of routines shown in FIG. 4 to FIG. 6 executed by the ECU 30 will be described.

Base-System Normative Model Routine

Figure 4:
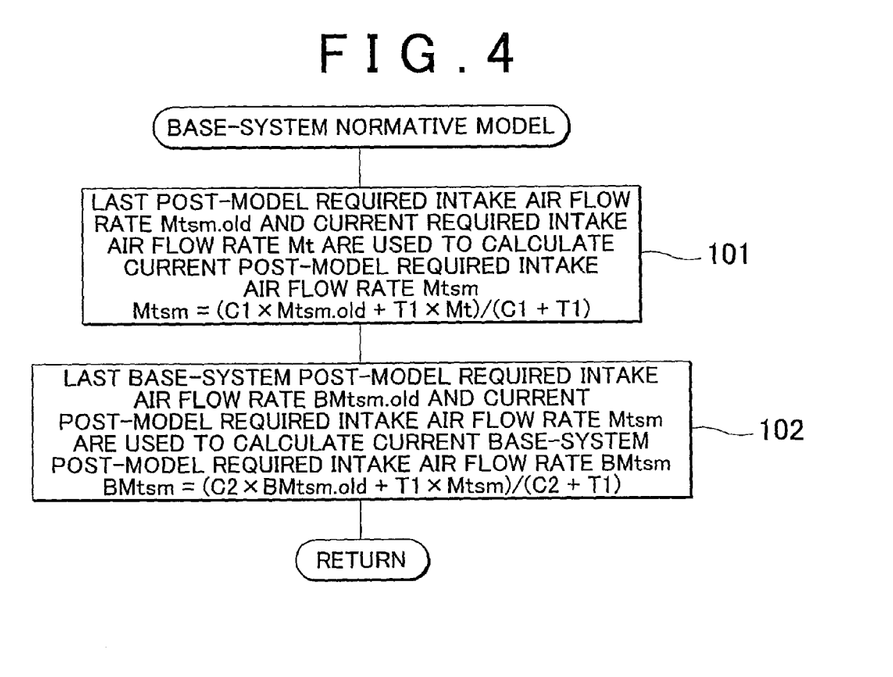
FIG. 4 is a flowchart that illustrates the flow of process of a base-system normative model routine.

The base-system normative model routine shown in FIG. 4 is repeatedly executed at a predetermined interval when the power of the ECU 30 is on. When the routine is started, first, in step 101, a current post-model required intake air flow rate Mtsm is calculated by a first-order lag model (first-order low-pass filter) expressed by the following mathematical expression using a last post-model required intake air flow rate Mtsm.old and a current required intake air flow rate Mt.

$$Mtsm=(C1 \times Mtsm.\text{old}+T1 \times Mt)/(C1+T1)$$

Here, C1 is a first-order lag filter time constant (for example, 10 ms), and T1 is a processing interval (for example, 8 ms).

After that, the process proceeds to step 102, and then a current base-system post-model required intake air flow rate BMtsm is calculated by a first-order lag model (first-order low-pass filter) expressed by the following mathematical expression using a last base-system post-model required intake air flow rate BMtsm.old and a current post-model required intake air flow rate Mtsm.

$$BMtsm=(C2 \times BMtsm.\text{old}+T1 \times Mtsm)/(C2+T1)$$

Here, C2 is a first-order lag filter time constant (for example, 32 ms), and T1 is a processing interval (for example, 8 ms).

High-Response-System Normative Model Routine

Figure 5:
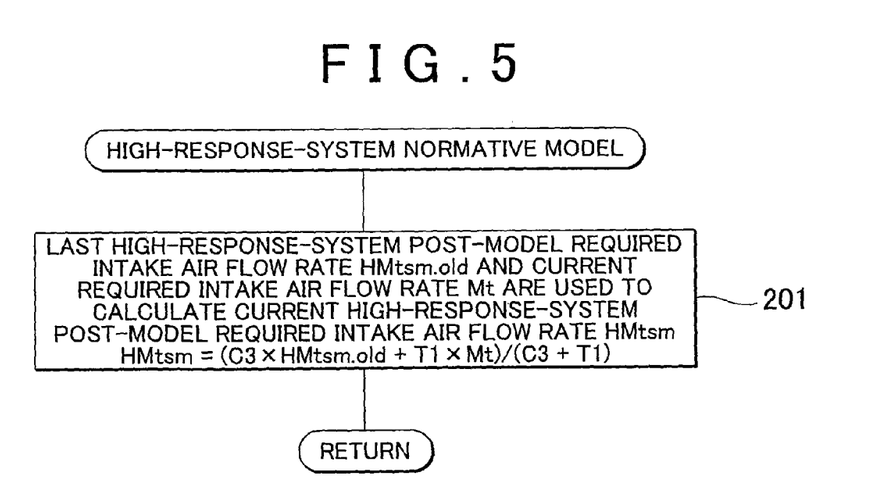
FIG. 5 is a flowchart that illustrates the flow of process of a high-response-system normative model routine.

The high-response-system normative model routine shown in FIG. 5 is repeatedly executed at a predetermined interval when the power of the ECU 30 is on. When the routine is started, in step 201, a current high-response-system post-model required intake air flow rate HMtsm is calculated by a first-order lag model (first-order low-pass filter) expressed by the following mathematical expression using a last high-response-system post-model required intake air flow rate HMtsm.old and a current required intake air flow rate Mt.

$$HMtsm=(C3 \times HMtsm.\text{old}+T1 \times Mt)/(C3+T1)$$

Here, C3 is a first-order lag filter time constant (for example, 32 ms), and T1 is a processing interval (for example, 8 ms).

Small-Variation Opening Degree Calculation Routine

Figure 6:
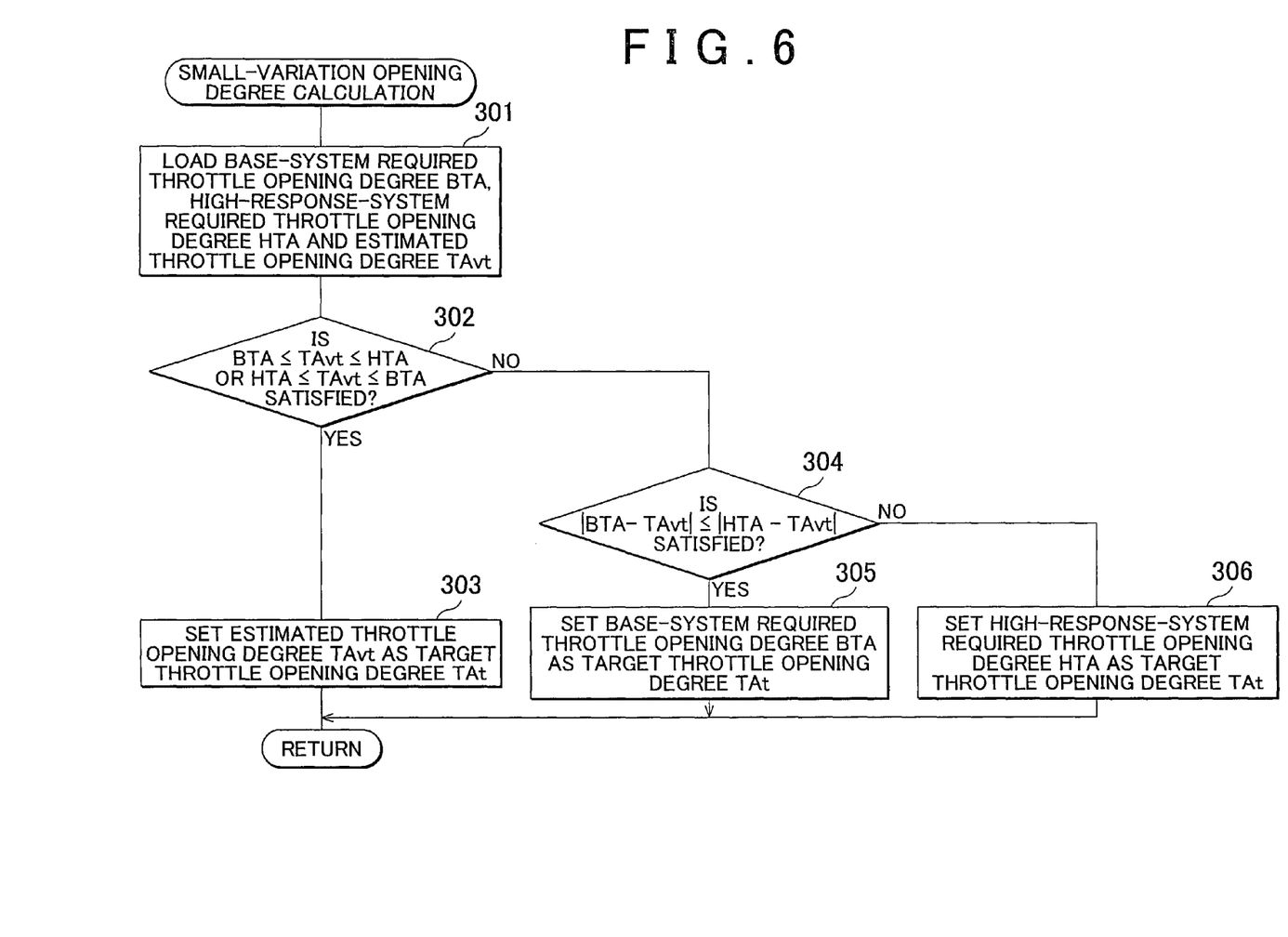
FIG. 6 is a flowchart that illustrates the flow of process of a small-variation opening degree calculation routine according to the first embodiment.

The small-variation opening degree calculation routine shown in FIG. 6 is repeatedly executed at a predetermined interval when the power of the ECU 30 is on. When the routine is started, first, in step 301, a base-system required throttle opening degree BTA, a high-response-system required throttle opening degree HTA and an estimated throttle opening degree TAvt (actual throttle opening degree estimated from a last final target throttle opening degree TAtt) are loaded.

After that, the process proceeds to step 302, and then it is determined whether the estimated throttle opening degree TAvt falls within the range from the base-system required throttle opening degree BTA to the high-response-system required throttle opening degree HTA (BTA≤TAvt≤HTA or HTA≤TAvt≤BTA).

When it is determined in step 302 that the estimated throttle opening degree TAvt falls within the range from the base-system required throttle opening degree BTA to the high-response-system required throttle opening degree HTA, the process proceeds to step 303 and then the estimated throttle opening degree TAvt is set as a target throttle opening degree TAt.

(Target throttle opening degree TAt=Estimated throttle opening degree TAvt)

In contrast to this, when it is determined in step 302 that the estimated throttle opening degree TAvt falls outside the range from the base-system required throttle opening degree BTA to the high-response-system required throttle opening degree HTA, the process proceeds to step 304 and then it is determined whether the absolute value of a difference between the base-system required throttle opening degree BTA and the estimated throttle opening degree TAvt (|BTA−TAvt|) is smaller than or equal to the absolute value of a difference between the high-response-system required throttle opening degree HTA and the estimated throttle opening degree TAvt (|HTA−TAvt|).

When it is determined in step 304 that the absolute value of the difference between the base-system required throttle opening degree BTA and the estimated throttle opening degree TAvt (|BTA−TAvt|) is smaller than or equal to the absolute value of the difference between the high-response-system required throttle opening degree HTA and the estimated throttle opening degree TAvt (|HTA−TAvt|), it is determined that the base-system required throttle opening degree BTA is closer to the estimated throttle opening degree TAvt than the high-response-system required throttle opening degree HTA. Then, the process proceeds to step 305, and the base-system required throttle opening degree BTA closer to the estimated throttle opening degree TAvt is set as the target throttle opening degree TAt.

(Target throttle opening degree TAt=Base-system required throttle opening degree BTA)

On the other hand, when it is determined in step 304 that the absolute value of the difference between the base-system required throttle opening degree BTA and the estimated throttle opening degree TAvt (|BTA−TAvt|) is larger than the absolute value of the difference between the high-response-system required throttle opening degree HTA and the estimated throttle opening degree TAvt (|HTA−TAvt|), it is determined that the high-response-system required throttle opening degree HTA is closer to the estimated throttle opening degree TAvt than the base-system required throttle opening degree BTA. Then, the process proceeds to step 306, and the high-response-system required throttle opening degree HTA closer to the estimated throttle opening degree TAvt is set as the target throttle opening degree TAt.

(Target throttle opening degree TAt=High-response-system required throttle opening degree HTA)

In the thus described first embodiment, the target throttle opening degree TAt is set so as to fall within the range from the base-system required throttle opening degree BTA to the high-response-system required throttle opening degree HTA (that is, an allowable range of the required throttle opening degree that is compensated for a delay in response of the intake system) and to reduce the variation amount of the target throttle opening degree TAt. Therefore, the target throttle opening degree TAt that is compensated for a delay in response of the intake system is set while suppressing oscillation of the target throttle opening degree TAt even during transitional operation of the engine 11. Thus, the amount of wear of the sliding portion of the throttle device formed of the throttle valve 16 and the motor 15 that drives the throttle valve 16 is reduced to thereby make it possible to improve durability and to prevent overheating of the motor 15 that drives the throttle valve 16.

In addition, in the first embodiment, the estimated throttle opening degree TAvt is set as the target throttle opening degree TAt when the estimated throttle opening degree TAvt (actual throttle opening degree estimated from the last final target throttle opening degree TAtt) falls within the range from the base-system required throttle opening degree BTA to the high-response-system required throttle opening degree HTA; whereas one of the base-system required throttle opening degree BTA and the high-response-system required throttle opening degree HTA, which is closer to the estimated throttle opening degree TAvt, is set as the target throttle opening degree TAt when the estimated throttle opening degree TAvt falls outside the range from the base-system required throttle opening degree BTA to the high-response-system required throttle opening degree HTA. Therefore, the deviation between the estimated throttle opening degree TAvt (estimated actual throttle opening degree) and the target throttle opening degree TAt may be reduced, and the variation amount of the actual throttle opening degree may be effectively reduced. Thus, it is possible to effectively improve durability by reducing the amount of wear of the sliding portion of the throttle device.

Next, a second embodiment of the invention will be described with reference to FIG. 7 to FIG. 9. However, the description of the components substantially similar to those of the first embodiment is omitted or simplified, and different components from those of the first embodiment will be mainly described.

Figure 7:
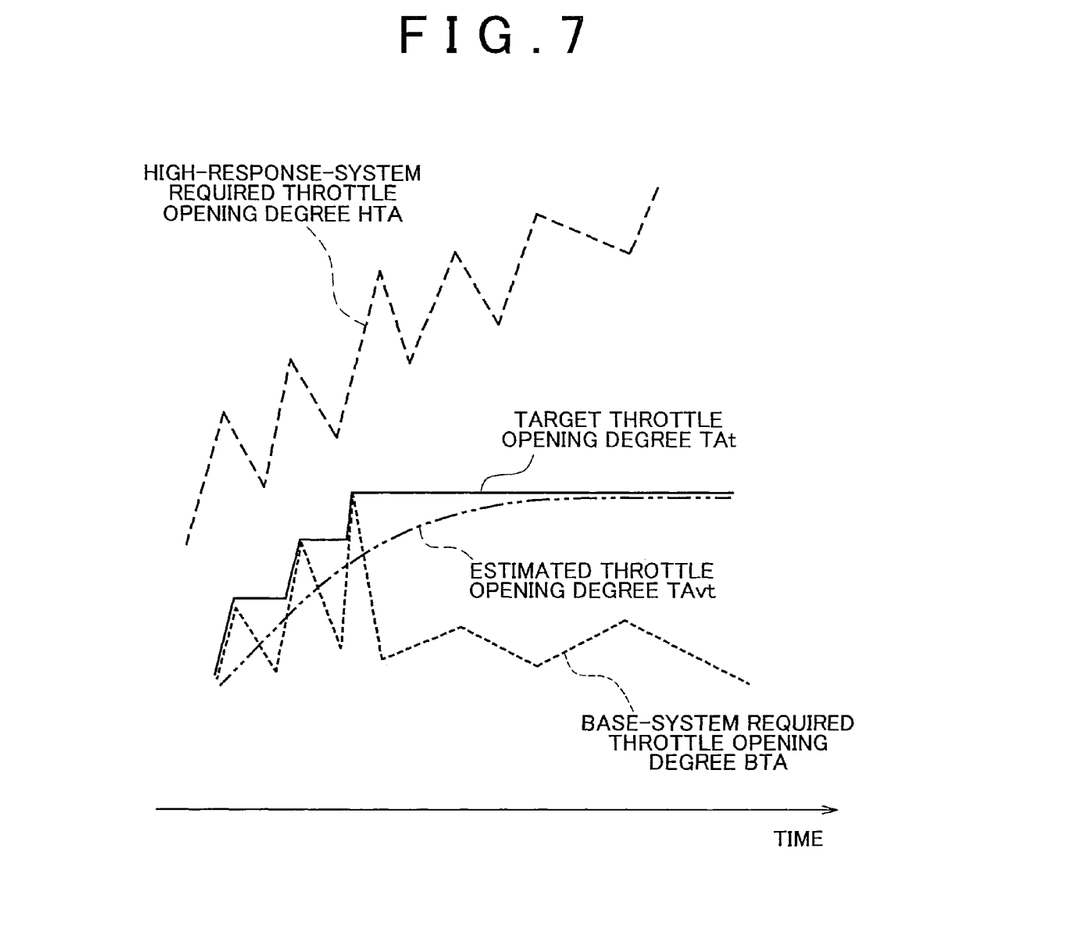
FIG. 7 is a time chart that illustrates a method of setting a target throttle opening degree according to a second embodiment.
Figure 8:
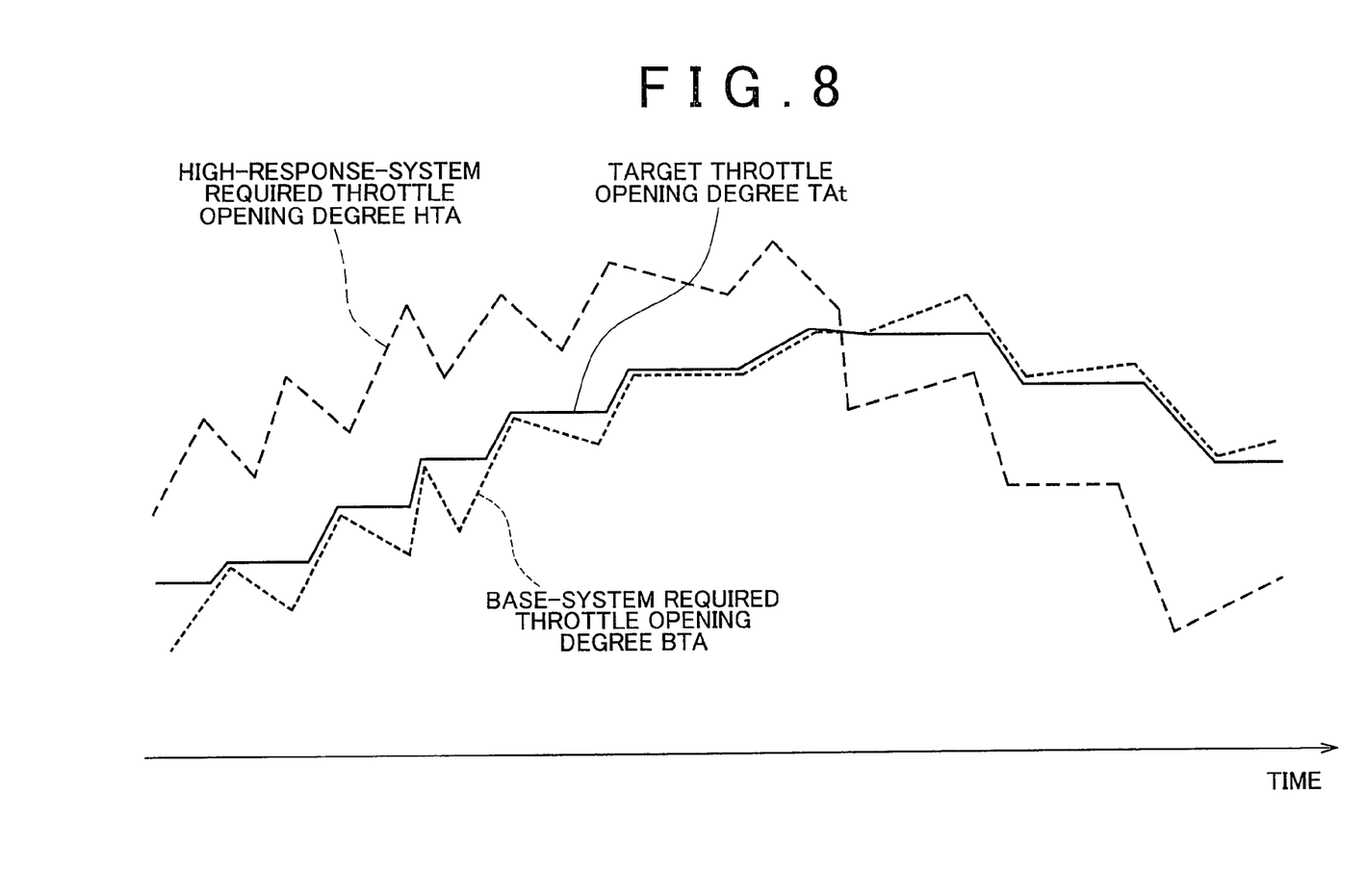
FIG. 8 is a time chart that shows the behavior of the target throttle opening degree according to the second embodiment.

In the second embodiment, the ECU 30 executes a small-variation opening degree calculation routine shown in FIG. 9, which will be described later, to set the estimated throttle opening degree TAvt as the current target throttle opening degree TAt when the last target throttle opening degree TAt.old falls within the range from the base-system required throttle opening degree BTA to the high-response-system required throttle opening degree HTA and to set one of the base-system required throttle opening degree BTA and the high-response-system required throttle opening degree HTA, which is closer to the last target throttle opening degree TAt.old, as the current target throttle opening degree TAt when the last target throttle opening degree TAt.old falls outside the range from the base-system required throttle opening degree BTA to the high-response-system required throttle opening degree HTA, as shown in FIG. 7. By so doing, as shown in FIG. 8, the variation amount of the target throttle opening degree TAt is reduced while maintaining the target throttle opening degree TAt within the range from the base-system required throttle opening degree BTA to the high-response-system required throttle opening degree HTA. In this case, the deviation between the last target throttle opening degree TAt.old and the current target throttle opening degree TAt may be reduced, so the variation amount of the target throttle opening degree TAt may be effectively reduced.

Figure 9:
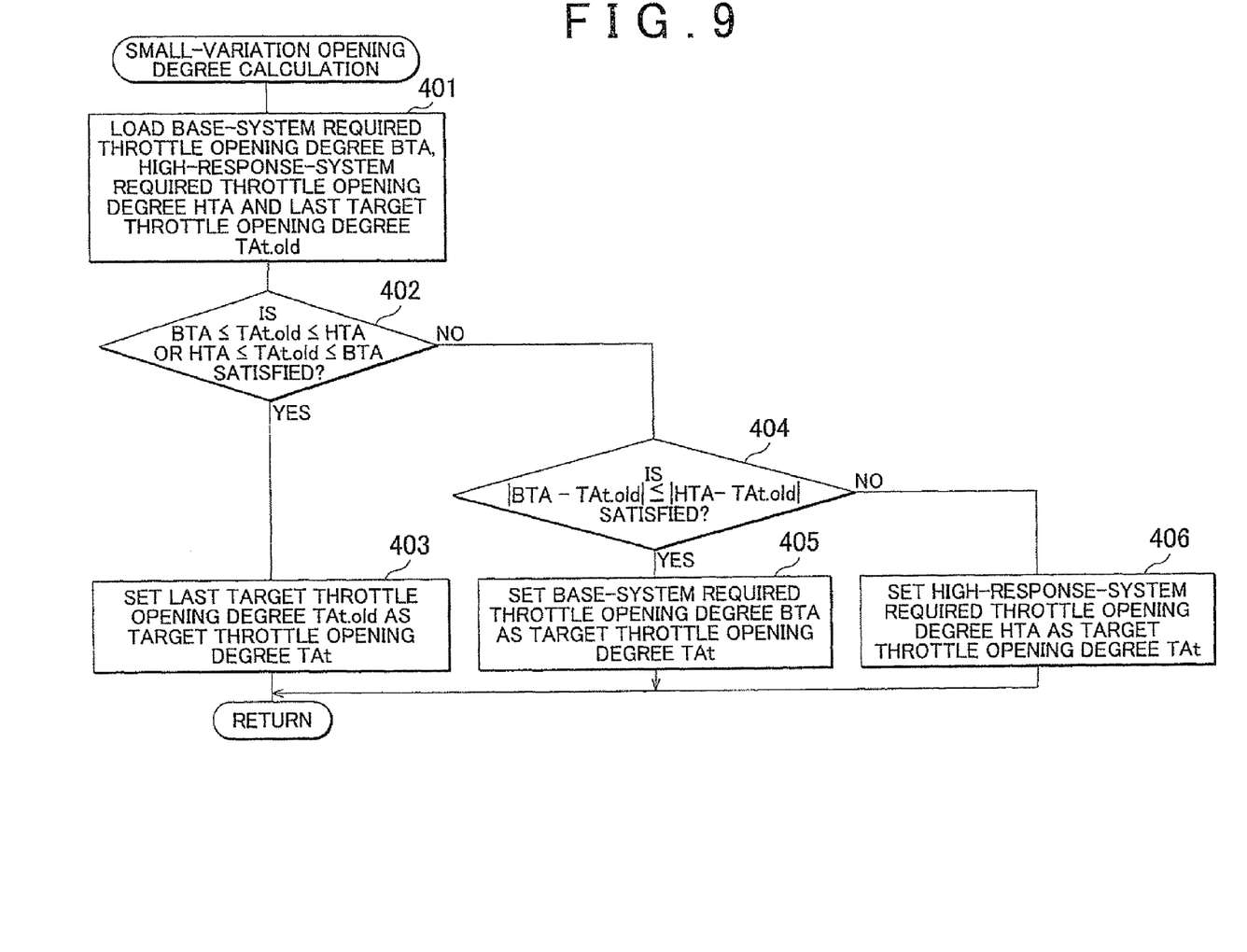
FIG. 9 is a flowchart that illustrates the flow of process of a small-variation opening degree calculation routine according to the second embodiment.

In the small-variation opening degree calculation routine shown in FIG. 9, first, in step 401, a base-system required throttle opening degree BTA, a high-response-system required throttle opening degree HTA and a last target throttle opening degree TAt.old are loaded.

After that, the process proceeds to step 402, and then it is determined whether the last target throttle opening degree TAt.old falls within the range from the base-system required throttle opening degree BTA to the high-response-system required throttle opening degree HTA (BTA≤TAt.old≤HTA or HTA≤TAt.old≤BTA).

When it is determined in step 402 that the last target throttle opening degree TAt.old falls within the range from the base-system required throttle opening degree BTA to the high-response-system required throttle opening degree HTA, the process proceeds to, step 403 and then the last target throttle opening degree TAt.old is set as a current target throttle opening degree TAt.

(Target throttle opening degree $TAt$=Last target throttle opening degree $TAt$.old)

In contrast to this, when it is determined in step 402 that the last target throttle opening degree TAt.old falls outside the range from the base-system required throttle opening degree BTA to the high-response-system required throttle opening degree HTA, the process proceeds to step 404 and then it is determined whether the absolute value of the difference between the base-system required throttle opening degree BTA and the last target throttle opening degree TAt.old (|BTA−TAt.old|) is smaller than or equal to the absolute value of the difference between the high-response-system required throttle opening degree HTA and the last target throttle opening degree TAt.old (|HTA−TAt.old|).

When it is determined in step 404 that the absolute value of the difference between the base-system required throttle opening degree STA and the last target throttle opening degree TAt.old (|BTA-TAt.old|) is smaller than or equal to the absolute value of the difference between the high-response-system required throttle opening degree HTA and the last target throttle opening degree TAt.old (|HTA-TAt.old|), it is determined that the base-system required throttle opening degree BTA is closer to the last target throttle opening degree TAt.old than the high-response-system required throttle opening degree PITA. Then, the process proceeds to step 405, and the base-system required throttle opening degree BTA closer to the last target throttle opening degree TAt.old is set as the current target throttle opening degree TAt.

(Target throttle opening degree $TAt$=Base-system required throttle opening degree $BTA$)

On the other hand, when it is determined in step 404 that the absolute value of the difference between the base-system required throttle opening degree BTA and the last target throttle opening degree TAt.old (|BTA−TAt.old|) is larger than the absolute value of the difference between the high-response-system required throttle opening degree HTA and the last target throttle opening degree TAt.old (|HTA−TAt.old|), it is determined that the high-response-system required throttle opening degree HTA is closer to the last target throttle opening degree TAt.old than the base-system required throttle opening degree BTA. Then, the process proceeds to step 406, and the high-response-system required throttle opening degree HTA closer to the last target throttle opening degree TAt.old is set as the current target throttle opening degree TAt.

(Target throttle opening degree $TAt$=High-response-system required throttle opening degree $HTA$)

In the thus described second embodiment, the last target throttle opening degree TAt.old is set as the current target throttle opening degree TAt when the last target throttle opening degree TAt.old falls within the range from the base-system required throttle opening degree BTA to the high-response-system required throttle opening degree HTA; whereas one of the base-system required throttle opening degree BTA and the high-response-system required throttle opening degree HTA, which is closer to the last target throttle opening degree TAt.old, is set as the current target throttle opening degree TAt when the last target throttle opening degree TAt.old falls outside the range from the base-system required throttle opening degree BTA to the high-response-system required throttle opening degree HTA. Therefore, the deviation between the last target throttle opening degree TAt.old and the current target throttle opening degree TAt may be reduced, and the variation amount of the target throttle opening degree TAt may be effectively reduced. Thus, fluctuations in electric current flowing through the motor 15 that drives the throttle valve 16 are suppressed to thereby make it possible to further effectively prevent overheating of the motor 15.

Note that, in the above first and second embodiments, the normative model is set to a first-order lag model; however, the normative model is not limited to the first-order lag model. The normative model may be changed where appropriate. For example, the normative model may be set to a second-order lag model.

In addition, in the above first and second embodiments, the response characteristic of the base-system normative model 31 is different from the response characteristic of the high-response-system normative model 33; however, the configuration is not limited. For example, the response characteristic of the inverse model of the intake system model used in the base-system response delay compensating means 32 may be different from the response characteristic of the inverse model of the intake system model used in the high-response-system response delay compensating means 34.

In addition, in the above first and second embodiments, the base-system required throttle opening degree (for example, low-response side allowable limit value of the required throttle opening degree) and the high-response-system required throttle opening degree (for example, high-response side allowable limit value of the required throttle opening degree) are calculated; however, the configuration is not limited. For example, it is also applicable that a plus-system required throttle opening degree is calculated in consideration of a delay in response of the intake system on the basis of a required intake air flow rate that is higher by a predetermined allowable amount (for example, 1%) than the required intake air flow rate Mt, a minus-system required throttle opening degree is calculated in consideration of a delay in response of the intake system on the basis of a required intake air flow rate that is lower by a predetermined allowable amount (for example, 1%) than the required intake air flow rate Mt, and then the target throttle opening degree is set so that the target throttle opening degree falls within the range from the minus-system required throttle opening degree to the plus-system required throttle opening degree and the variation amount of the target throttle opening degree is smaller than the variation amount of the required throttle opening degree.

Other than the above, the aspect of the invention is not limited to the intake port injection engine shown in FIG. 1; instead, the aspect of the invention may be applied to an in-cylinder injection type engine or a dual injection type engine that includes both a fuel injection valve for intake port injection and a fuel injection valve for in-cylinder injection.

The invention claimed is:

1. An intake air flow rate control device for an internal combustion engine, which has a function of calculating a target throttle opening degree on the basis of a required intake air flow rate of the internal combustion engine, the intake air flow rate control device comprising:
   a first required throttle opening degree calculation portion that calculates a first required throttle opening degree in consideration of a delay in response of an intake system on the basis of the required intake air flow rate;
   a second required throttle opening degree calculation portion that calculates a second required throttle opening degree in consideration of a delay in response of the intake system on the basis of the required intake air flow rate in a response characteristic different from that of the first required throttle opening degree calculation portion; and
   a target throttle opening degree calculation portion that calculates the target throttle opening degree on the basis of the first required throttle opening degree and the second required throttle opening degree, wherein the target throttle opening degree calculation portion sets the target throttle opening degree so that the target throttle opening degree falls within a range from the first required throttle opening degree to the second required throttle opening degree and a variation amount of the target throttle opening degree is smaller than a variation amount of any one of the first and second required throttle opening degrees.

2. The intake air flow rate control device according to claim 1, wherein the first required throttle opening degree calculation portion and the second required throttle opening degree calculation portion each have a function of converting the required intake air flow rate to a post-model required intake air flow rate that is a required intake air flow rate at a response that is able to be achieved by a predetermined normative model, and calculating the required throttle opening degree so as to achieve the post-model required intake air flow rate using the inverse model of an intake system model that takes a delay in response of the intake system into consideration, a response characteristic of the normative model in the first required throttle opening degree calculation portion is different from a response characteristic of the normative model in the second required throttle opening degree calculation portion.

3. The intake air flow rate control device according to claim 1, further comprising:
   a throttle opening degree estimating portion that calculates an estimated throttle opening degree, which is an estimated actual throttle opening degree, on the basis of a last value of the target throttle opening degree, wherein
   the target throttle opening degree calculation portion sets the estimated throttle opening degree as the target throttle opening degree when the estimated throttle opening degree falls within the range from the first required throttle opening degree to the second required throttle opening degree, and sets one of the first required throttle opening degree and the second required throttle opening degree, which is closer to the estimated throttle opening degree, as the target throttle opening degree when the estimated throttle opening degree falls outside the range from the first required throttle opening degree to the second required throttle opening degree.

4. The intake air flow rate control device according to claim 1, wherein the target throttle opening degree calculation portion sets a last value of the target throttle opening degree as a current value of the target throttle opening degree when the last value of the target throttle opening degree falls within the range from the first required throttle opening degree to the second required throttle opening degree, and sets one of the first required throttle opening degree and the second required throttle opening degree, which is closer to the last value of the target throttle opening degree, as the current value of the target throttle opening degree when the last value of the target throttle opening degree falls outside the range from the first required throttle opening degree to the second required throttle opening degree.

* * * * *